United States Patent
Rashid et al.

(10) Patent No.: US 11,503,620 B2
(45) Date of Patent: Nov. 15, 2022

(54) TECHNIQUES FOR IDENTIFYING A SCHEDULING REQUEST OCCASION FOR CONNECTED DISCONTINUOUS RECEPTION

(71) Applicant: QUALCOMM Incorporated, San Diego, CA (US)

(72) Inventors: Farrukh Rashid, San Diego, CA (US); Min Wang, San Diego, CA (US); Omesh Kumar Handa, San Marcos, CA (US); Rajarajan Rajendran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 73 days.

(21) Appl. No.: 16/947,957

(22) Filed: Aug. 25, 2020

(65) Prior Publication Data
US 2021/0144734 A1 May 13, 2021

Related U.S. Application Data

(60) Provisional application No. 62/933,771, filed on Nov. 11, 2019.

(51) Int. Cl.
*H04W 72/12* (2009.01)
*H04W 72/04* (2009.01)
*H04W 76/28* (2018.01)

(52) U.S. Cl.
CPC ... *H04W 72/1263* (2013.01); *H04W 72/0446* (2013.01); *H04W 76/28* (2018.02)

(58) Field of Classification Search
CPC ......... H04W 72/1263; H04W 72/0446; H04W 76/28

(Continued)

(56) References Cited

U.S. PATENT DOCUMENTS 10,271,347 B2 * 4/2019 Loehr ................... H04W 76/28
2014/0301373 A1 * 10/2014 Cili ....................... H04L 67/325
370/336

(Continued)

FOREIGN PATENT DOCUMENTS

WO    WO-2016029933 A1 *  3/2016  ............ H04W 72/14

OTHER PUBLICATIONS

International Search Report and Written Opinion—PCT/US2020/070680—ISA/EPO—dated Jan. 26, 2021.

*Primary Examiner* — Intekhaab A Siddiquee
(74) *Attorney, Agent, or Firm* — Dalei Dong; Harrity & Harrity, LLP

(57) ABSTRACT

Various aspects of the present disclosure generally relate to wireless communication. In some aspects, a user equipment (UE) may identify, based at least in part a determination to transmit one or more packets, a scheduling request (SR) occasion in which to transmit an SR for uplink resources to transmit the one or more packets, the SR occasion occurring prior to a start of a connected discontinuous reception (CDRX) on duration of the UE. The UE may determine whether the SR occasion occurs within a threshold amount of time prior to the start of the CDRX on duration of the UE. The UE may transmit the SR in the SR occasion based at least in part on the determination of whether the SR occasion occurs within the threshold amount of time prior to the start of the CDRX on duration of the UE. Numerous other aspects are provided.

20 Claims, 9 Drawing Sheets

(58) Field of Classification Search
USPC .......................................................... 370/329
See application file for complete search history.

(56) References Cited

U.S. PATENT DOCUMENTS

| 2015/0092643 | A1 | 4/2015 | Khay-Ibbat et al. | |
| 2017/0055294 | A1* | 2/2017 | Lee | H04W 74/0833 |
| 2017/0208619 | A1* | 7/2017 | Yang | H04W 72/1284 |

* cited by examiner

TECHNIQUES FOR IDENTIFYING A SCHEDULING REQUEST OCCASION FOR CONNECTED DISCONTINUOUS RECEPTION

CROSS-REFERENCE TO RELATED APPLICATION

This Patent Application claims priority to U.S. Provisional Patent Application No. 62/933,771, filed on Nov. 11, 2019, entitled "TECHNIQUES FOR IDENTIFYING A SCHEDULING REQUEST OCCASION FOR CONNECTED DISCONTINUOUS RECEPTION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques for identifying a scheduling request occasion for connected discontinuous reception.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include identifying, based at least in part a determination to transmit one or more packets, a scheduling request (SR) occasion in which to transmit an SR for uplink resources to transmit the one or more packets, the SR occasion occurring prior to a start of a connected discontinuous reception (CDRX) on duration of the UE; determining whether the SR occasion occurs within a threshold amount of time prior to the start of the CDRX on duration of the UE; and transmitting the SR in the SR occasion based at least in part on the determination of whether the SR occasion occurs within the threshold amount of time prior to the start of the CDRX on duration of the UE.

In some aspects, an SR occasion periodicity, configured for the UE, comprises a 10 millisecond periodicity or a 20 millisecond periodicity. In some aspects, determining whether the SR occasion occurs within the threshold amount of time prior to the start of the CDRX on duration of the UE comprises determining that the SR occasion occurs within the threshold amount of time prior to the start of the CDRX on duration of the UE, and transmitting the SR in the SR occasion based at least in part on whether the SR occasion occurs within the threshold amount of time prior to the start of the CDRX on duration of the UE comprises transmitting the SR in the SR occasion based at least in part on the determination that the SR occasion occurs within the threshold amount of time prior to the start of the CDRX on duration of the UE.

In some aspects, determining whether the SR occasion occurs within the threshold amount of time prior to the start of the CDRX on duration of the UE comprises determining that the SR occasion does not occur within the threshold amount of time prior to the start of the CDRX on duration of the UE, and transmitting the SR in the SR occasion based at least in part on whether the SR occasion occurs within the threshold amount of time prior to the start of the CDRX on duration of the UE comprises refraining from transmitting the SR in the SR occasion based at least in part on the determination that the SR occasion does not occur within the threshold amount of time prior to the start of the CDRX on duration of the UE.

In some aspects, the SR occasion is a first SR occasion, and the method further comprises identifying, based at least in part on refraining from transmitting the SR in the first SR occasion, a second SR occasion that occurs after the first SR occasion, determining whether the second SR occasion occurs during the CDRX on duration of the UE, and transmitting the SR in the second SR occasion based at least in part on the determination of whether the second SR occasion occurs during the CDRX on duration of the UE. In some aspects, determining whether the second SR occasion occurs during the CDRX on duration of the UE comprises determining that the second SR occasion occurs during the CDRX on duration of the UE, and transmitting the SR in the second SR occasion comprises transmitting the SR in the second SR occasion based at least in part on the determination that the second SR occasion occurs during the CDRX on duration of the UE.

In some aspects, determining whether the second SR occasion occurs during the CDRX on duration of the UE comprises determining that the second SR occasion does not occur during the CDRX on duration of the UE, and transmitting the SR in the second SR occasion comprises refraining from transmitting the SR in the second SR occasion based at least in part on the determination that the second SR occasion does not occur during the CDRX on duration of the UE. In some aspects, the method further comprises identifying, based at least in part on refraining from transmitting the SR in the second SR occasion, a third SR occasion that occurs after the second SR occasion; determining whether the third SR occasion occurs within the threshold amount of time prior to another CDRX on duration in another CDRX cycle of the UE; and transmitting the SR in the third SR occasion based at least in part on the determination of whether the third SR occasion occurs within the threshold amount of time prior to the other CDRX on duration in the other CDRX cycle of the UE.

In some aspects, the method further comprises determining to transmit one or more packets based at least in part on receiving one or more packets at a modem of the UE from an Internet protocol multimedia subsystem (IMS) layer of the UE, wherein the one or more is packets are received at the modem at a time prior to a starting time of the threshold amount of time based at least in part on an uplink packet offset time of the modem. In some aspects, the uplink packet offset time of the modem is based at least in part on an uplink processing parameter of the modem, a wake-up processing time of the modem and a timing of the SR occasion, and where an indication of the uplink packet offset time, an indication of a downlink processing time, and an indication of a CDRX onDurationtimer value is provided from the modem to the IMS layer of the UE.

In some aspects, a UE for wireless communication may include memory and one or more processors operatively coupled to the memory. The memory and the one or more processors may be configured to identify, based at least in part a determination to transmit one or more packets, an SR occasion in which to transmit an SR for uplink resources to transmit the one or more packets, the SR occasion occurring prior to a start of a CDRX on duration of the UE; determine whether the SR occasion occurs within a threshold amount of time prior to the start of the CDRX on duration of the UE; and transmit the SR in the SR occasion based at least in part on the determination of whether the SR occasion occurs within the threshold amount of time prior to the start of the CDRX on duration of the UE.

In some aspects, an SR occasion periodicity, configured for the UE, comprises a 10 millisecond periodicity or a 20 millisecond periodicity. In some aspects, the one or more processors, when determining whether the SR occasion occurs within the threshold amount of time prior to the start of the CDRX on duration of the UE, are to determine that the SR occasion occurs within the threshold amount of time prior to the start of the CDRX on duration of the UE; and wherein the one or more processors, when transmitting the SR in the SR occasion based at least in part on whether the SR occasion occurs within the threshold amount of time prior to the start of the CDRX on duration of the UE, are to transmit the SR in the SR occasion based at least in part on the determination that the SR occasion occurs within the threshold amount of time prior to the start of the CDRX on duration of the UE.

In some aspects, the one or more processors, when determining whether the SR occasion occurs within the threshold amount of time prior to the start of the CDRX on duration of the UE, are to determine that the SR occasion does not occur within the threshold amount of time prior to the start of the CDRX on duration of the UE; and wherein the one or more processors, when transmitting the SR in the SR occasion based at least in part on whether the SR occasion occurs within the threshold amount of time prior to the start of the CDRX on duration of the UE, are to refrain from transmitting the SR in the SR occasion based at least in part on the determination that the SR occasion does not occur within the threshold amount of time prior to the start of the CDRX on duration of the UE. In some aspects, the SR occasion is a first SR occasion, and wherein the one or more processors are further configured to identify, based at least in part on refraining from transmitting the SR in the first SR occasion, a second SR occasion that occurs after the first SR occasion determine whether the second SR occasion occurs during the CDRX on duration of the UE; and transmit the SR in the second SR occasion based at least in part on the determination of whether the second SR occasion occurs during the CDRX on duration of the UE.

In some aspects, the one or more processors, when determining whether the second SR occasion occurs during the CDRX on duration of the UE, are to determine that the second SR occasion occurs during the CDRX on duration of the UE; and wherein the one or more processors, when transmitting the SR in the second SR occasion, are to transmit the SR in the second SR occasion based at least in part on the determination that the second SR occasion occurs during the CDRX on duration of the UE. In some aspects, the one or more processors, when determining whether the second SR occasion occurs during the CDRX on duration of the UE, are to determine that the second SR occasion does not occur during the CDRX on duration of the UE; and wherein the one or more processors, when transmitting the SR in the second SR occasion, are to refrain from transmitting the SR in the second SR occasion based at least in part on the determination that the second SR occasion does not occur during the CDRX on duration of the UE.

In some aspects, the one or more processors are further configured to identify, based at least in part on refraining from transmitting the SR in the second SR occasion, a third SR occasion that occurs after the second SR occasion; determine whether the third SR occasion occurs within the threshold amount of time prior to another CDRX on duration in another CDRX cycle of the UE; and transmit the SR in the third SR occasion based at least in part on the determination of whether the third SR occasion occurs within the threshold amount of time prior to the other CDRX on duration in the other CDRX cycle of the UE. In some aspects, the one or more processors are further configured to determine to transmit one or more packets based at least in part on receiving the one or more packets at a modem of the UE from an Internet protocol multimedia subsystem (IMS) layer of the UE, wherein the one or more packets are received at the modem at a time prior to a starting time of the threshold amount of time based at least in part on an uplink packet offset time of the modem.

In some aspects, the uplink packet offset time of the modem is based at least in part on an uplink processing parameter of the modem, a wake-up processing time of the modem, and a timing of the SR occasion; and wherein an indication of the uplink packet offset time, an indication of a downlink processing time, and an indication of a CDRX onDurationtimer value is provided from the modem to the IMS layer of the UE.

In some aspects, a non-transitory computer-readable medium may store one or more instructions for wireless communication. The one or more instructions, when executed by one or more processors of a UE, may cause the one or more processors to identify, based at least in part a determination to transmit one or more packets, an SR occasion in which to transmit an SR for uplink resources to transmit the one or more packets, the SR occasion occurring prior to a start of a CDRX on duration of the UE; determine whether the SR occasion occurs within a threshold amount of time prior to the start of the CDRX on duration of the UE; and transmit the SR in the SR occasion based at least in part on the determination of whether the SR occasion occurs within the threshold amount of time prior to the start of the CDRX on duration of the UE.

In some aspects, an SR occasion periodicity, configured for the UE, comprises a 10 millisecond periodicity or a 20 millisecond periodicity. In some aspects, the one or more instructions, that cause the one or more processors to determine whether the SR occasion occurs within the threshold amount of time prior to the start of the CDRX on duration of the UE, cause the one or more processors to determine that the SR occasion occurs within the threshold amount of time prior to the start of the CDRX on duration of the UE; and wherein the one or more instructions, that cause the one or more processors to transmit the SR in the SR occasion based at least in part on whether the SR occasion occurs within the threshold amount of time prior to the start of the CDRX on duration of the UE, cause the one or more processors to transmit the SR in the SR occasion based at least in part on the determination that the SR occasion occurs within the threshold amount of time prior to the start of the CDRX on duration of the UE.

In some aspects, the one or more instructions, that cause the one or more processors to determine whether the SR occasion occurs within the threshold amount of time prior to the start of the CDRX on duration of the UE, cause the one or more processors to determine that the SR occasion does not occur within the threshold amount of time prior to the start of the CDRX on duration of the UE; and wherein the one or more instructions, that cause the one or more processors to transmit the SR in the SR occasion based at least in part on whether the SR occasion occurs within the threshold amount of time prior to the start of the CDRX on duration of the UE, cause the one or more processors to refrain from transmitting the SR in the SR occasion based at least in part on the determination that the SR occasion does not occur within the threshold amount of time prior to the start of the CDRX on duration of the UE. In some aspects, the SR occasion is a first SR occasion; and wherein the one or more instructions, when executed by the one or more processors, further cause the one or more processor to identify, based at least in part on refraining from transmitting the SR in the first SR occasion, a second SR occasion that occurs after the first SR occasion; determine whether the second SR occasion occurs during the CDRX on duration of the UE; and transmit the SR in the second SR occasion based at least in part on the determination of whether the second SR occasion occurs during the CDRX on duration of the UE.

In some aspects, the one or more instructions, that cause the one or more processors to determine whether the second SR occasion occurs during the CDRX on duration of the UE, cause the one or more processors to determine that the second SR occasion occurs during the CDRX on duration of the UE; and wherein the one or more instructions, that cause the one or more processors to transmit the SR in the second SR occasion, cause the one or more processors to transmit the SR in the second SR occasion based at least in part on the determination that the second SR occasion occurs during the CDRX on duration of the UE. In some aspects, the one or more instructions, that cause the one or more processors to determine whether the second SR occasion occurs during the CDRX on duration of the UE, cause the one or more processors to determine that the second SR occasion does not occur during the CDRX on duration of the UE; and wherein the one or more instructions, that cause the one or more processors to transmit the SR in the second SR occasion, cause the one or more processors to refrain from transmitting the SR in the second SR occasion based at least in part on the determination that the second SR occasion does not occur during the CDRX on duration of the UE.

In some aspects, the one or more instructions, when executed by the one or more processors, further cause the one or more processors to identify, based at least in part on refraining from transmitting the SR in the second SR occasion, a third SR occasion that occurs after the second SR occasion; and determine whether the third SR occasion occurs within the threshold amount of time prior to another CDRX on duration in another CDRX cycle of the UE; and transmit the SR in the third SR occasion based at least in part on the determination of whether the third SR occasion occurs within the threshold amount of time prior to the other CDRX on duration in the other CDRX cycle of the UE. In some aspects, the one or more instructions, when executed by the one or more processors, further cause the one or more processors to determine to transmit one or more packets based at least in part on receiving the one or more packets at a modem of the UE from an IMS layer of the UE, wherein the one or more packets are received at the modem at a time prior to a starting time of the threshold amount of time based at least in part on an uplink packet offset time of the modem.

In some aspects, the uplink packet offset time of the modem is based at least in part on an uplink processing parameter of the modem, a wake-up processing time of the modem, and a timing of the SR occasion; and wherein an indication of the uplink packet offset time, an indication of a downlink processing time, and an indication of a CDRX onDurationtimer value is provided from the modem to the IMS layer of the UE.

In some aspects, an apparatus for wireless communication may include means for identifying, based at least in part a determination to transmit one or more packets, an SR occasion in which to transmit an SR for uplink resources to transmit the one or more packets, the SR occasion occurring prior to a start of a CDRX on duration of the apparatus; means for determining whether the SR occasion occurs within a threshold amount of time prior to the start of the CDRX on duration of the apparatus; and means for transmitting the SR in the SR occasion based at least in part on the determination of whether the SR occasion occurs within the threshold amount of time prior to the start of the CDRX on duration of the apparatus.

In some aspects, an SR occasion periodicity, configured for the apparatus, comprises a 10 millisecond periodicity or a 20 millisecond periodicity. In some aspects, the means for determining whether the SR occasion occurs within the threshold amount of time prior to the start of the CDRX on duration of the apparatus comprises means for determining that the SR occasion occurs within the threshold amount of time prior to the start of the CDRX on duration of the apparatus; and wherein the means for transmitting the SR in the SR occasion based at least in part on whether the SR occasion occurs within the threshold amount of time prior to the start of the CDRX on duration of the apparatus comprises means for transmitting the SR in the SR occasion based at least in part on the determination that the SR occasion occurs within the threshold amount of time prior to the start of the CDRX on duration of the apparatus.

In some aspects, the means for determining whether the SR occasion occurs within the threshold amount of time prior to the start of the CDRX on duration of the apparatus comprises means for determining that the SR occasion does not occur within the threshold amount of time prior to the start of the CDRX on duration of the apparatus; and wherein the means for transmitting the SR in the SR occasion based at least in part on whether the SR occasion occurs within the threshold amount of time prior to the start of the CDRX on duration of the apparatus comprises means for refraining from transmitting the SR in the SR occasion based at least in part on the determination that the SR occasion does not occur within the threshold amount of time prior to the start of the CDRX on duration of the apparatus.

In some aspects, the SR occasion is a first SR occasion; and wherein the apparatus further comprises means for identifying, based at least in part on refraining from transmitting the SR in the first SR occasion, a second SR occasion that occurs after the first SR occasion; means for determining whether the second SR occasion occurs during the CDRX on duration of the apparatus; and means for transmitting the SR in the second SR occasion based at least in part on the determination of whether the second SR occasion occurs during the CDRX on duration of the apparatus. In some aspects, the means for determining whether the second SR occasion occurs during the CDRX on duration of the apparatus comprises means for determining that the second SR occasion occurs during the CDRX on duration of the apparatus; and wherein the means for transmitting the SR in the second SR occasion comprises means for transmitting the SR in the second SR occasion based at least in part on the determination that the second SR occasion occurs during the CDRX on duration of the apparatus.

In some aspects, the means for determining whether the second SR occasion occurs during the CDRX on duration of the apparatus comprises means for determining that the second SR occasion does not occur during the CDRX on duration of the apparatus; and wherein the means for transmitting the SR in the second SR occasion comprises means for refraining from transmitting the SR in the second SR occasion based at least in part on the determination that the second SR occasion does not occur during the CDRX on duration of the apparatus. In some aspects, the apparatus further comprises means for identifying, based at least in part on refraining from transmitting the SR in the second SR occasion, a third SR occasion that occurs after the second SR occasion; means for determining whether the third SR occasion occurs within the threshold amount of time prior to another CDRX on duration in another CDRX cycle of the apparatus; and means for transmitting the SR in the third SR occasion based at least in part on the determination of whether the third SR occasion occurs within the threshold amount of time prior to the other CDRX on duration in the other CDRX cycle of the apparatus.

In some aspects, the apparatus further comprises means for determining to transmit one or more packets based at least in part on receiving the one or more packets at a modem of the apparatus from an IMS layer of the apparatus, wherein the one or more packets are received at the modem at a time prior to a starting time of the threshold amount of time based at least in part on an uplink packet offset time of the modem. In some aspects, the uplink packet offset time of the modem is based at least in part on an uplink processing parameter of the modem, a wake-up processing time of the modem, and a timing of the SR occasion; and wherein an indication of the uplink packet offset time, an indication of a downlink processing time, and an indication of a CDRX onDurationtimer value is provided from the modem to the IMS layer of the apparatus.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings.

This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
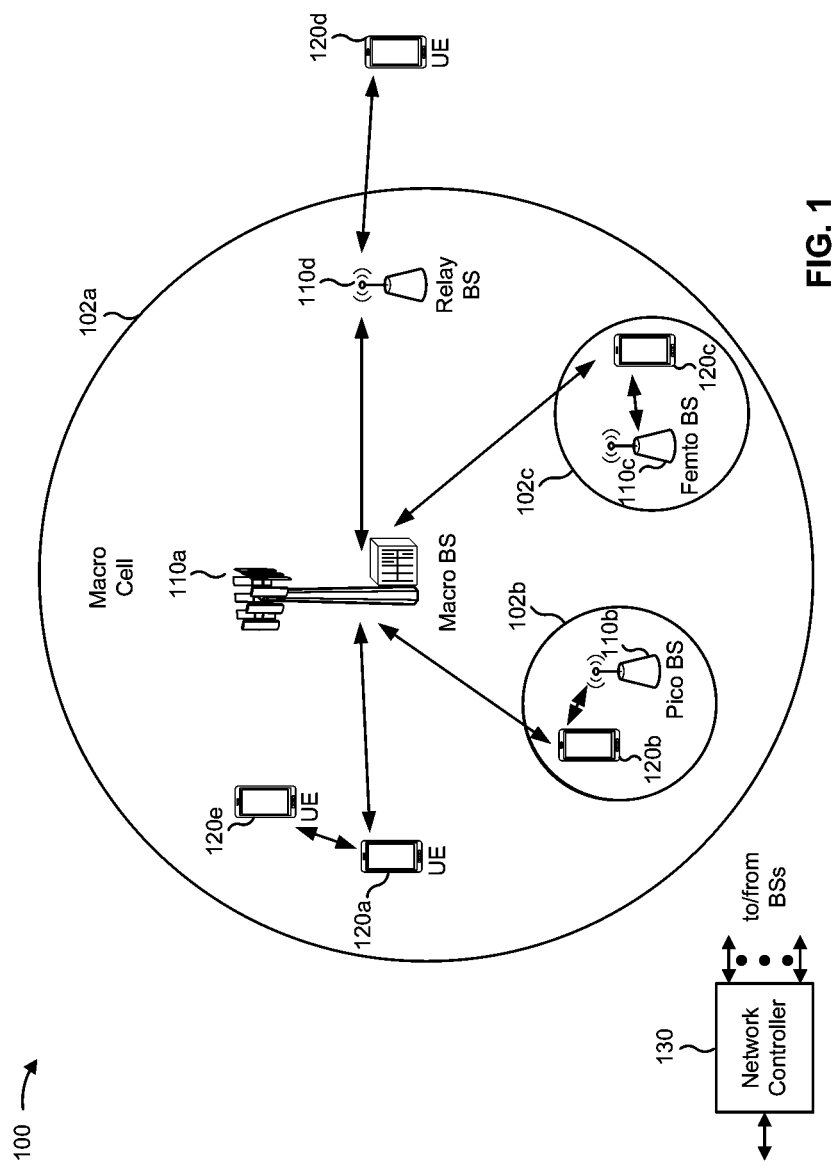
FIG. 1 is a diagram illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110*a*, BS 110*b*, BS 110*c*, and BS 110*d*) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110*d* may communicate with macro BS 110*a* and a UE 120*d* in order to facilitate communication between BS 110*a* and UE 120*d*. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
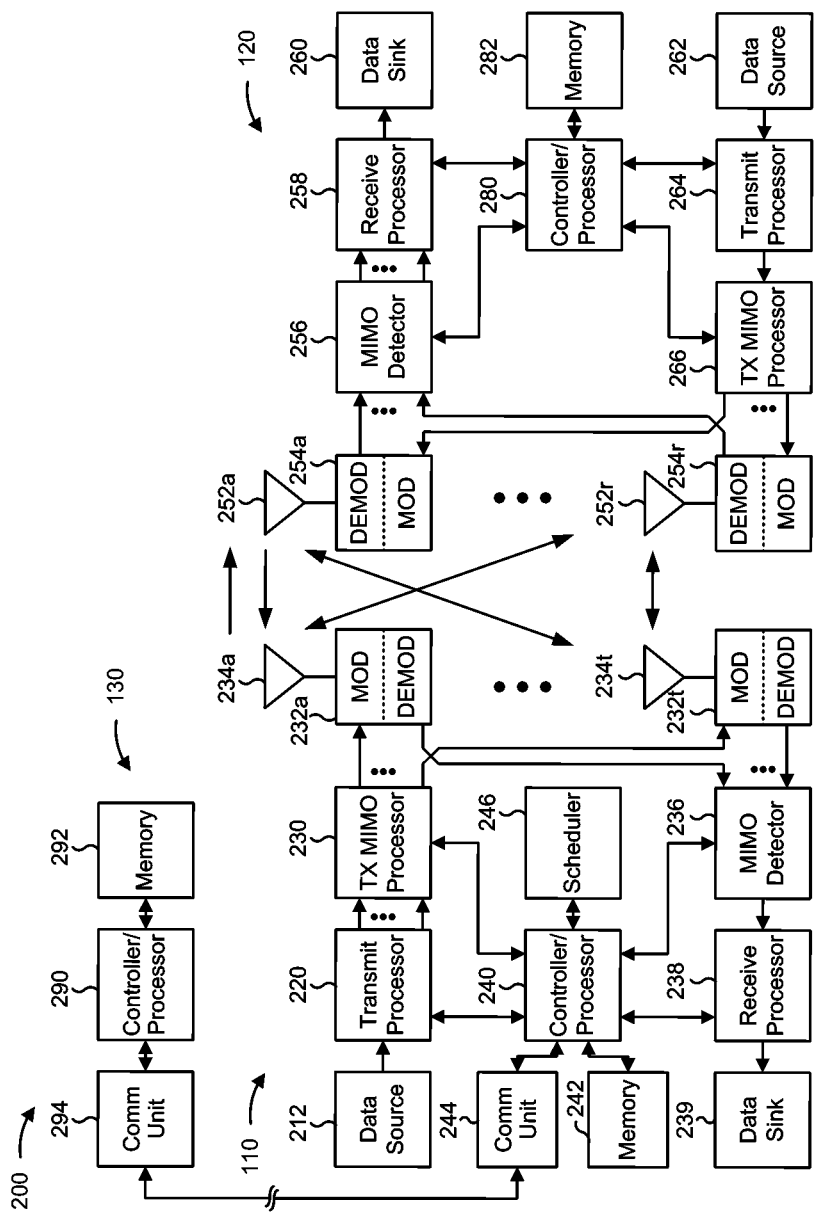
FIG. 2 is a diagram illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with identifying a scheduling request (SR) occasion for connected discontinuous reception (CDRX), as described in more detail elsewhere herein. For example, controller/processor 240 of base station 110, controller/processor 280 of UE 120, and/or any other component(s) of FIG. 2 may perform or direct operations of, for example, process 400 of FIG. 4 and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 400 of FIG. 4 and/or other processes as described herein. A scheduler 246 may schedule UEs for data transmission on the downlink and/or uplink.

In some aspects, UE 120 may include means for identifying, based at least in part a determination to transmit one or more packets, an SR occasion in which to transmit an SR for uplink resources to transmit the one or more packets, the SR occasion occurring prior to a start of a CDRX on duration of the UE, means for determining whether the SR occasion occurs within a threshold amount of time prior to the start of the CDRX on duration of the UE, means for transmitting the SR in the SR occasion based at least in part on the determination of whether the SR occasion occurs within the threshold amount of time prior to the start of the CDRX on duration of the UE, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

A UE may be enabled for voice over LTE (VoLTE), voice over NR (VoNR), and/or another packet-based voice operation, which enables the UE to transmit voice information in packets (e.g., over LTE channels, over 5G/NR channels, and/or the like). The UE may include an audio layer and a modem layer. The audio layer may generate voice information. When voice information is ready for transmission, the audio layer may send the voice information to the modem layer. The modem layer may encode and transmit the voice information as packets over an LTE or 5G/NR wireless network.

To transmit the packets, the modem layer of the UE may transmit an SR to a BS. The SR may be a request for uplink resources (e.g., time-domain resources, such as symbols, slots, and/or the like, and/or frequency-domain resources, such as subcarriers, component carriers, and/or the like) in which the UE may transmit the packets. The modem layer may receive an uplink scheduling grant that schedules the uplink resources for the UE based at least in part on transmitting the SR.

In some cases, the modem layer may be configured based on CDRX cycles, where the UE periodically transitions to a CDRX on mode for a CDRX on duration to monitor for downlink transmissions (e.g., from a BS), and then returns to a CDRX sleep mode until the next CDRX cycle. In this case, the audio layer and the modem layer of the UE may operate asynchronously, which may cause decreased performance and efficiency of the UE's CDRX operation. For example, the audio layer may transmit voice information to the modem layer at a timing that causes the UE to prematurely transition out of a CDRX sleep cycle to transmit an SR for transmitting packets carrying the voice information. As another example, the audio layer may transmit voice information to the modem layer at a timing that causes the modem to transmit an SR too far in advance of a CDRX on duration of the UE. In either case, the CDRX operation of the UE may be interrupted, which may cause decreased performance and efficiency of the UE's CDRX operation, may decrease battery performance of the UE, and/or the like.

Moreover, because the BS may be coordinated with the UE's CDRX operation, the UE may transmit the SR in SR occasions in which the BS does not expect the UE to transmit the SR (e.g., because the BS expects the UE to be in a CDRX sleep mode during the SR occasions). As a result, the BS may not monitor the SR occasions and may not receive the SR in the SR occasions. Thus, processing, memory, and radio resources are wasted on transmitting the SR in SR occasions that are not monitored by the BS.

Some aspects described herein provide techniques for identifying an SR occasion for CDRX. In some aspects, a UE may be capable of identifying an SR occasion in which to transmit an SR based at least in part on an algorithm that takes into account the CDRX operation of the UE. For example, the UE may attempt to identify an SR occasion that occurs within a threshold amount of time prior to a CDRX on duration of the UE, may transmit an SR in the SR occasion, and may refrain from transmitting in other SR occasions. If the UE is unable to identify an SR occasion that occurs within the threshold amount of time, the UE may attempt to identify an SR occasion that occurs during the CDRX on duration of the UE, may transmit an SR in the SR occasion, and may refrain from transmitting in other SR occasions. In this way, the UE is already in a CDRX on mode when transmitting the SR, and does not need to transition out of a CDRX sleep mode to transmit the SR. If the UE is unable to identify an SR occasion that occurs during the CDRX on duration of the UE, the UE may wait until the threshold amount of time prior to the next CDRX on duration to identify an SR occasion. In this way, the UE reduces the amount of time that the UE awakes from a CDRX sleep mode prior to the CDRX on duration and conserves processing, memory, battery, and radio resources that would have otherwise been consumed on transmitting an SR in the other SR occasions.

FIGS. 3A-3E are diagrams illustrating one or more examples 300 of identifying an SR occasion for CDRX, in accordance with various aspects of the present disclosure. As shown in FIGS. 3A-3E, example(s) 300 may include a UE (e.g., UE 120). In some aspects, the UE may communicate with a BS (e.g., BS 110) on a wireless access link, which may include an uplink and a downlink. In some aspects, the UE may be configured to perform CDRX operation such that the UE transitions between a CDRX on mode and a CDRX sleep mode according to a CDRX cycle.

Figure 3A:
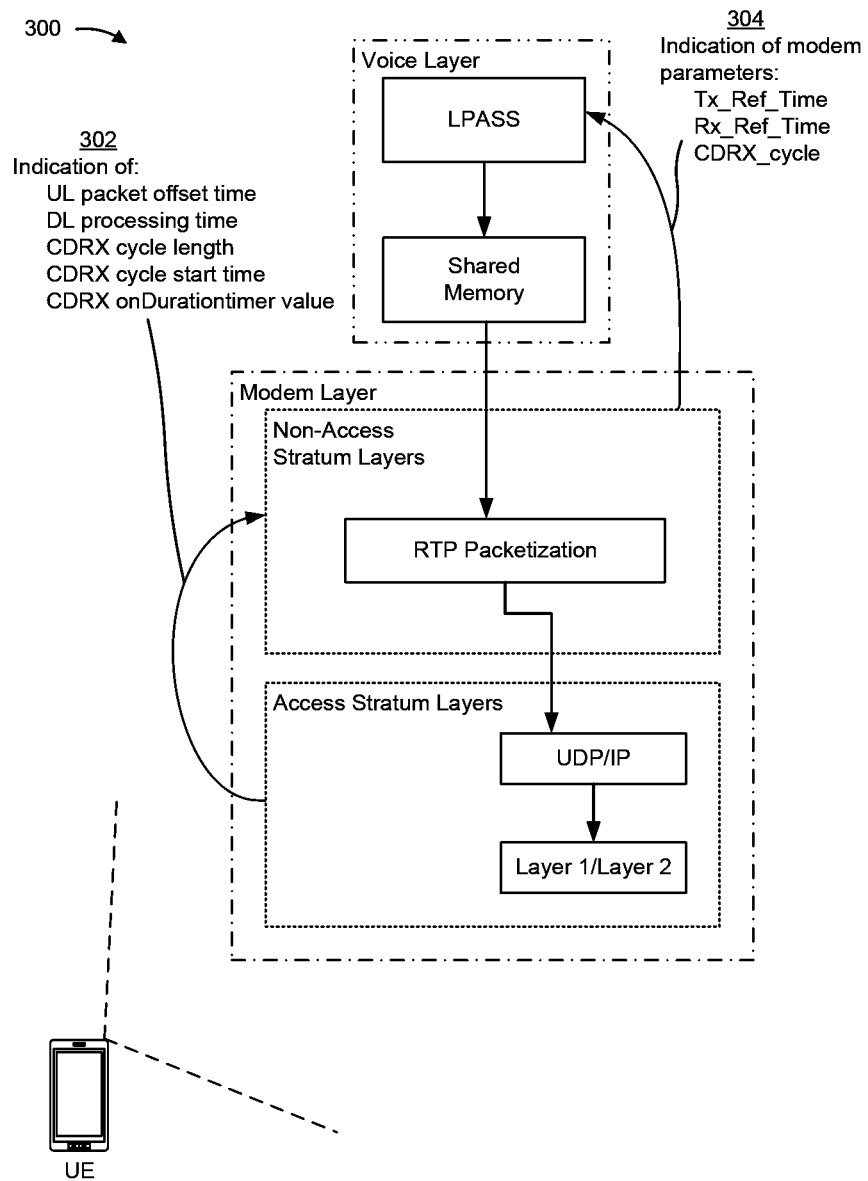
FIGS. 3A-3E are diagrams illustrating one or more examples of identifying a scheduling request occasion for connected discontinuous reception, in accordance with various aspects of the present disclosure.

As shown in FIG. 3A, the UE may be configured with a plurality of types of layers. The layers may be implemented by one or more components of the UE, such as a receive processor (e.g., receive processor 258), a data source (e.g., data source 262), a transmit processor (e.g., transmit processor 264), a controller/processor (e.g., a controller/processor 280), a memory (e.g., a memory 282), a modem that is implemented by one or more of the receive processor, the transmit processor, the controller/processor, and/or the memory, and/or the like.

In some aspects, the layers may include a voice layer and a modem layer. The voice layer may be implemented by the controller/processor, the memory, the data source, and/or other components. A low-power audio subsystem (LPASS) of the voice layer may generate and receive voice information (e.g., voice call information, VoLTE information, VoNR information, and/or the like), may provide voice information to other layers of the UE, and/or the like. The LPASS may provide voice information to other layers of the UE using a mailbox technique, which may include storing the voice information in shared memory such that the voice information may be retrieved by the other layers of the UE.

The modem layer may be made up of non-access stratum (NAS) layers and access stratum (AS) layers. The NAS layers may include an Internet protocol (IP) multimedia subsystem (IMS) layer in which packetization of voice information occurs. In this case, the modem (e.g., implemented by the receive processor, the transmit processor, the controller/processor, memory, and/or the like) of the UE may retrieve voice information from the shared memory, and may perform real-time protocol (RTP) packetization of the voice information to generate packets (e.g., voice packets) carrying the voice information. The packets may be provided to the AS layers of the modem, which may include layers 1-3 (e.g., a physical layer, a transport layer, a user datagram protocol (UDP)/layer, and/ or the like). At layers 1-3, the modem may process the packets for transport on the wireless access link to the BS.

As shown in FIG. 3A, and by reference number 302, to ensure that the modem layer and the voice layer are synchronized to the CDRX operation of the UE, the AS layers of the modem may provide, to the NAS layers, an indication of one or more parameters of the modem. In some aspects, the one or more parameters may include an uplink packet offset time, which may be an amount of time the modem takes to receive a packet and transport the packet on the uplink. The uplink packet offset time ensures that the voice layer provides voice information to the modem layer far enough in advance for the modem layer to wake, process, and transmit an SR for packets carrying the voice information.

The uplink packet offset time may be based at least in part on an uplink processing parameter of the modem, a wake-up processing time of the modem, and a timing of SR occasions configured for the UE. The uplink processing parameter may indicate an amount of time for performing Layer 1-3 processing of a packet. The wake-up processing time may indicate an amount of time the modem takes to wake up and be ready to transmit a packet. The timing of SR occasions may indicate an amount of time between an SR occasion and a CDRX on duration of the UE.

In some aspects, the one or more parameters may include a downlink processing time parameter, which may indicate an amount of time the modem takes to process downlink packets received at the UE. In some aspects, the one or more parameters include one or more CDRX parameters associated with CDRX operation of the UE. The one or more CDRX parameters may include a CDRX cycle length (e.g., which may specify a time duration of the periodic CDRX cycles of the UE), a CDRX cycle start time (e.g., which may specify a symbol, a slot, and/or the like at which a CDRX cycle of the UE is to start), a CDRX onDurationtimer value (e.g., a duration of a CDRX on duration of the UE), and/or the like.

As further shown in FIG. 3A, and by reference number 304, the NAS layers of the modem may receive the indication of the one or more parameters and may provide, to the voice layer (e.g., the LPASS), an indication of one or more modem parameters. In some aspects, the one or more modem parameters may include a Tx_Ref_Time parameter, which may correspond to the uplink packet offset time indicated by the AS layers. In some aspects, the one or more modem parameters may include an Rx_Ref_Time parameter, which may be an indication of an amount of time after which received packets or frames are available for decoding. The Rx_Ref_Time parameter may be based at least in part on the downlink processing time parameter and the CDRX onDurationtimer value indicated by the AS layers. In some aspects, the one or more modem parameters may include a CDRX_cycle parameter, which may indicate one or more of the CDRX parameters indicated by the AS layers.

The modem of the UE may receive voice information from the audio layer (e.g., based at least in part on the one or more modem parameters), may generate one or more packets (e.g., voice packets) carrying the voice information in an IMS layer of the NAS layers of the modem layer of the UE, and may provide the one or more packets to the AS layers of the modem layer. The modem, at the AS layers of the modem layer, may identify an SR occasion in which to transmit an SR for uplink resources for transmitting the one or more packets.

Figure 3B:
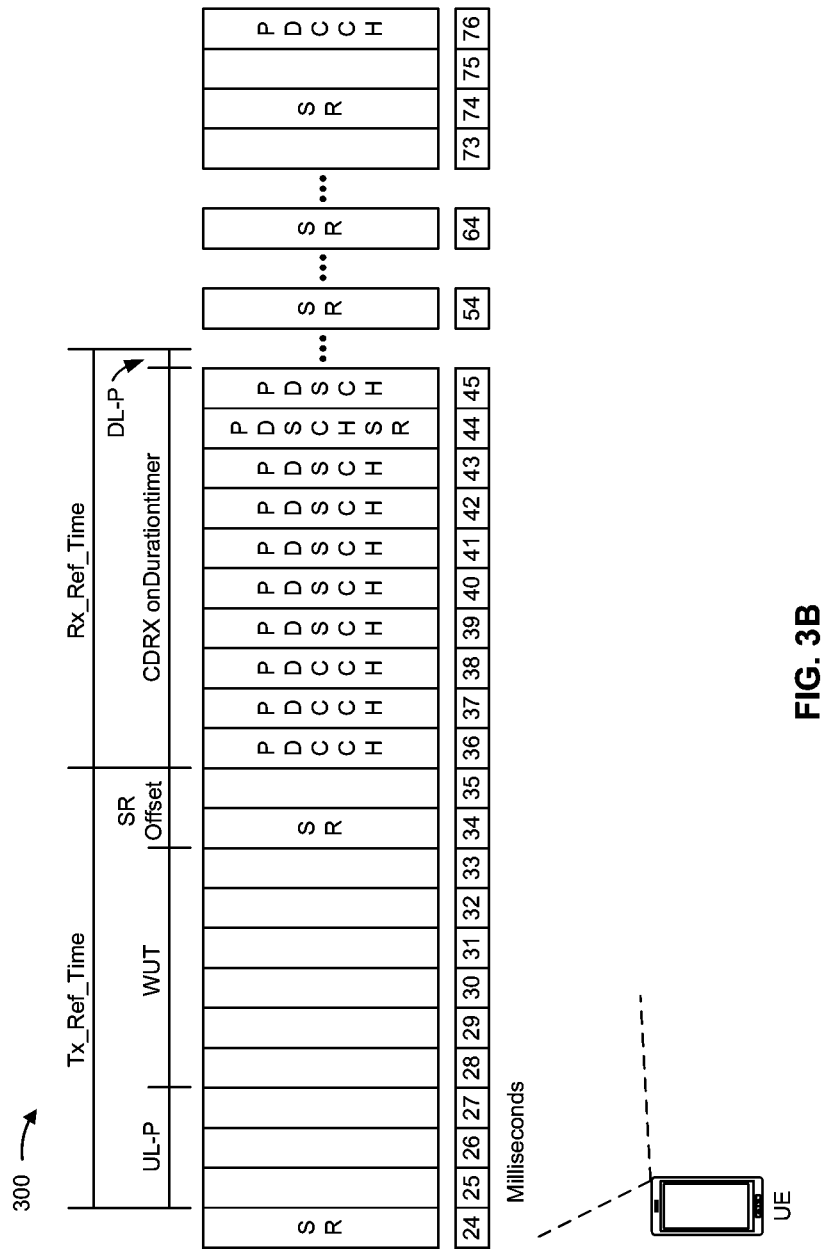

As shown in FIG. 3B, the UE may be configured with an SR occasion periodicity, in which SR occasions for the UE occur at particular times. As an example, and as shown in FIG. 3B, the UE may be configured with a 10 millisecond SR occasion periodicity, where SR occasions occur every 10 milliseconds (e.g., at 24 milliseconds, at 34 milliseconds, and so on). In some aspects, the UE may be configured with other SR occasion periodicities, such as a 20 millisecond SR occasion periodicity and/or the like.

As further shown in FIG. 3B, the UE may be configured with a CDRX offset of 36 milliseconds, in which case the CDRX cycle starts at 36 milliseconds (e.g., 36 milliseconds into a radio frame or relative to another starting point). The CDRX cycle length may be a 40 millisecond cycle length, as illustrated in FIG. 3B, or another cycle length. The CDRX onDurationtimer of the UE may be set to 10 milliseconds and/or another value, which may determine the amount of time the UE remains in the CDRX on mode.

As further shown in FIG. 3B, an example Tx_Ref_Time (e.g., uplink packet offset time) for the modem may be 11 milliseconds based at least in part on an uplink processing time (UL-P) of 3 milliseconds, an SR offset of 2 milliseconds (e.g., 2 milliseconds between the SR occasion prior to the first physical downlink control channel (PDCCH) occasion of the CDRX on duration of the UE), and a wake-up processing time (WUT) of 6 milliseconds. As further shown in FIG. 3B, an example Rx_Ref_Time for the modem may be 13 milliseconds based at least in part on a CDRX onDurationtimer value of 10 milliseconds and a downlink processing time (DL-P) of 3 milliseconds.

As further shown in FIG. 3B, the CDRX on duration of the UE may include an example configuration of PDCCH occasions, in which the UE may receive PDCCH communications, and physical downlink shared channel (PDSCH) occasions, in which the UE may receive PDSCH communications. In some aspects, the PDCCH occasions may be front-loaded in the CDRX on duration, in which case the PDSCH occasions may follow after the PDCCH occasions.

Figure 3C:
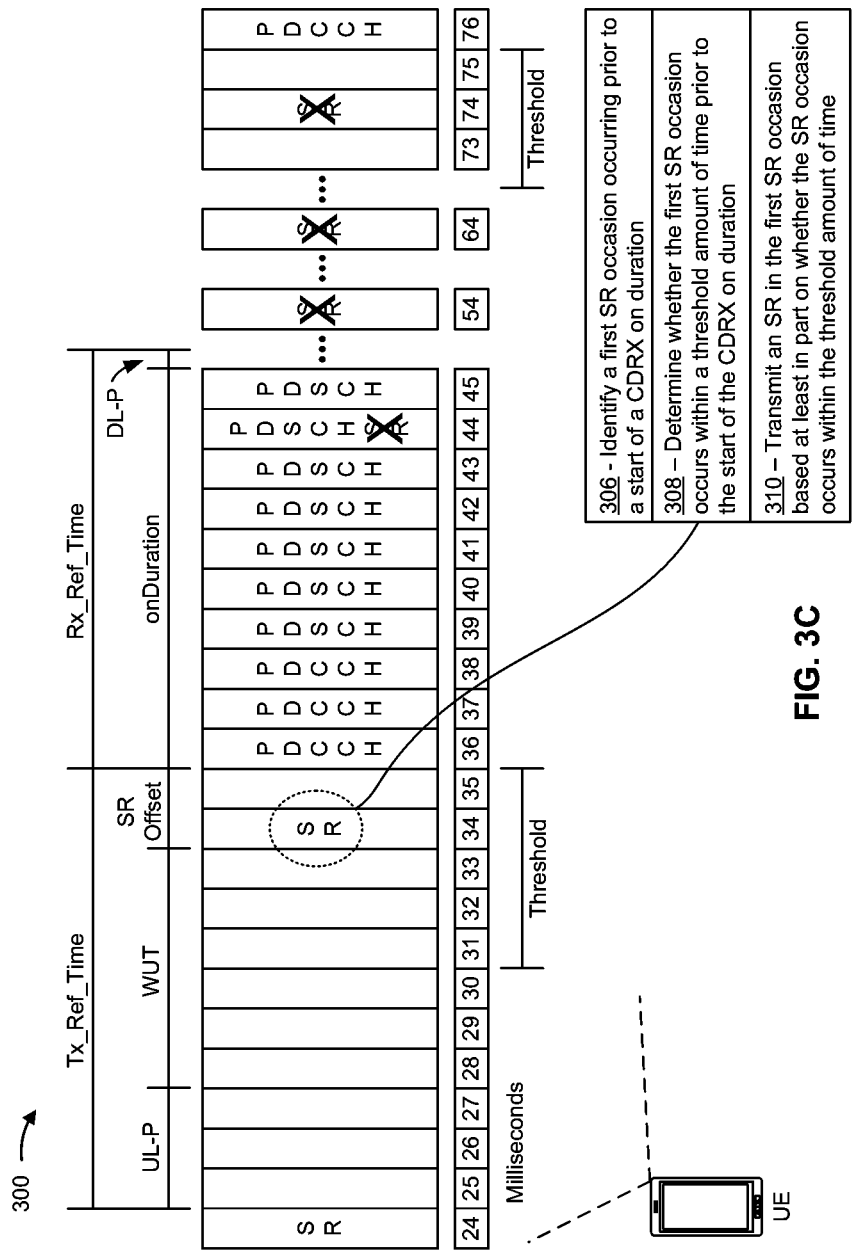
Figure 3D:
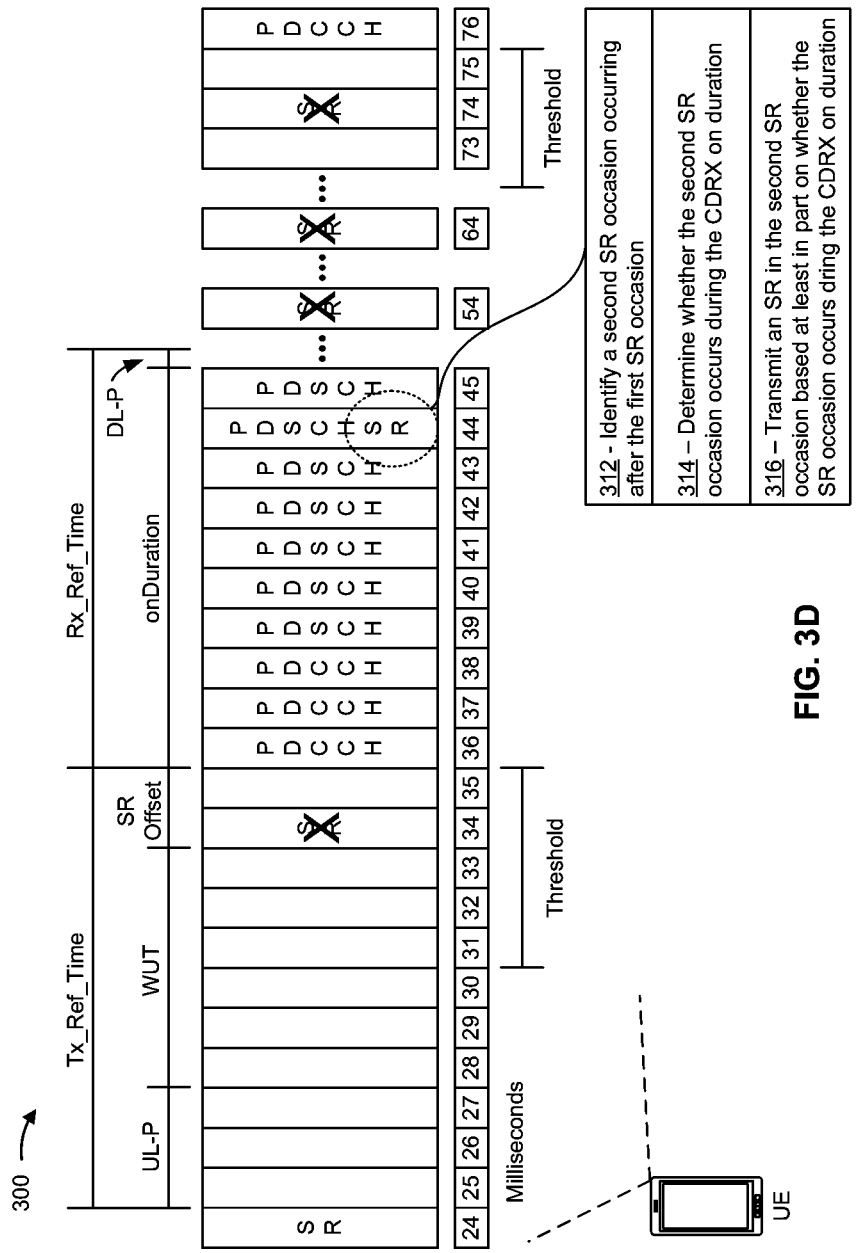
Figure 3E:
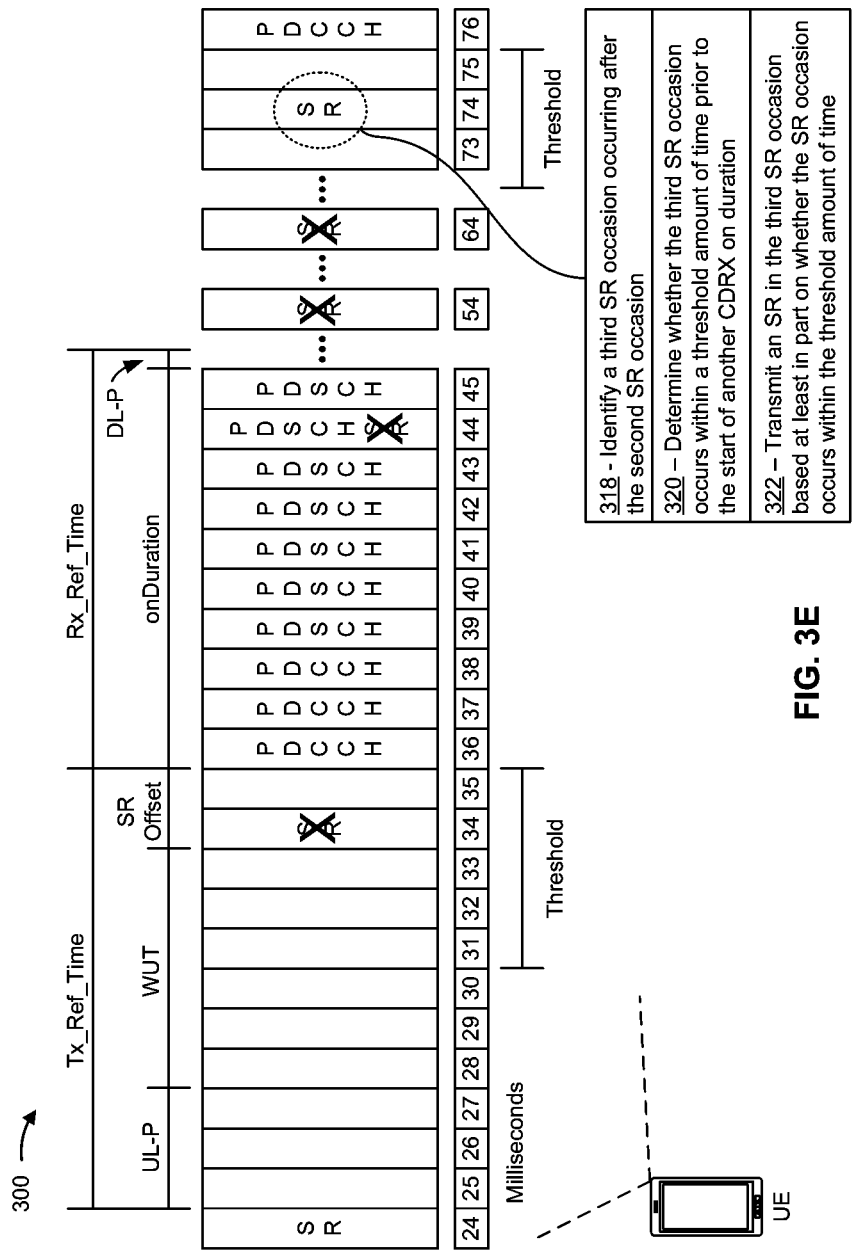

FIGS. 3C-3E illustrate one or more example aspects of an algorithm for identifying an SR occasion in which to transmit an SR for one or more packets. As shown in FIG. 3C, and by reference number 306, the UE may identify a first SR occasion occurring prior to a start (e.g., prior to a first PDCCH occasion) of a CDRX on duration of the UE. In some aspects, the UE may identify the first SR occasion that occurs in time after the modem of the UE receives the one or more packets. In the example illustrated in FIG. 3C, the modem may receive the one or more packets at 24 milliseconds, in which case the first SR occasion may be the SR occasion that occurs at 34 milliseconds.

As further shown in FIG. 3C, and by reference number 308, the UE may determine whether the first SR occasion occurs within a threshold amount of time prior to the start of the CDRX on duration. The threshold amount of time may include one or more milliseconds prior to the start of the CDRX on duration, and may be specified to ensure that there is sufficient time prior to the SR occasion to process the one or more packets and to transmit the SR. Moreover, the threshold amount of time may be specified to ensure that the SR occasion selected by the UE is close enough to the start of the CRDX on duration so that the UE does not wake up too early from a CDRX sleep mode to transmit the SR, thereby conserving the power saving properties of CDRX operation.

As shown in FIG. 3C, an example threshold amount of time may be 5 milliseconds prior to the start of the CDRX on duration. In this case, the UE may determine whether the first SR occasion occurs within 5 milliseconds of the start of the CDRX on duration. In some aspects, the threshold amount of time may be greater than 5 milliseconds. In some aspects, the threshold amount of time may be less than 5 milliseconds.

As further shown in FIG. 3C, and by reference number 310, the UE may transmit the SR in the first SR occasion based at least in part on the determination of whether the first SR occasion occurs within the threshold amount of time. If the UE determines that the first SR occasion occurs within the threshold amount of time prior to the start of the CDRX on duration, the UE may transmit the SR in the first SR occasion. As an example, if the first SR occasion occurs at 2 milliseconds prior to the start of the CDRX on duration, as illustrated in the example in FIG. 3C, the UE may transmit the SR in the first SR occasion if the threshold amount of time is 5 milliseconds. The UE may refrain from transmitting the SR for the one or more packets in other SR occasions to refrain from coming out of a CDRX sleep mode to transmit the SR, to conserve processing, memory, battery, and radio resources, and/or the like.

If the UE determines that the first SR occasion does not occur within the threshold amount of time prior to the start of the CDRX on duration, the UE may refrain from transmitting the SR in the first SR occasion. As an example, if the first SR occasion occurs 7 milliseconds prior to the start of the CDRX on duration, the UE may refrain from transmitting the SR in the first SR occasion if the threshold amount of time is 5 milliseconds.

As shown in FIG. 3D, and by reference number 312, if the UE refrains from transmitting the SR in the first SR occasion, the UE may identify a second SR occasion occurring after the first SR occasion. The second SR occasion may be the next SR occasion after the first SR occasion in the SR occasion periodicity for the UE. In the example illustrated in FIG. 3D, the second SR occasion may be the SR occasion that occurs at 44 milliseconds.

As further shown in FIG. 3D, and by reference number 314, the UE may determine whether the second SR occasion occurs during the CDRX on duration of the UE. In this case, the UE may determine whether the second SR occasion occurs while the UE is in the CDRX on mode.

As further shown in FIG. 3D, and by reference number 316, the UE may transmit the SR in the second SR occasion based at least in part on whether the second SR occasion occurs during the CDRX on duration. If the UE determines that the second SR occasion occurs during the CDRX on duration, as illustrated in the example in FIG. 3D, the UE may transmit the SR in the second SR occasion. The UE may refrain from transmitting the SR for the one or more packets in other SR occasions to refrain from coming out of a CDRX sleep mode to transmit the SR, to conserve processing, memory, battery, and radio resources, and/or the like.

If the UE determines that the second SR occasion does not occur during the CDRX on duration, the UE may refrain from transmitting the SR in the second SR occasion. For example, if the UE determines that the second SR occurs after expiration of the CDRX on duration, the UE may refrain from transmitting the SR in the second SR occasion.

As shown in FIG. 3E, and by reference number 318, if the UE refrains from transmitting the SR in the second SR occasion, the UE may identify a third SR occasion occurring after the second SR occasion. For example, the third SR occasion may be the SR occasion at 54 milliseconds, at 64 milliseconds, or at 74 milliseconds.

As further shown in FIG. 3E, and by reference number 320, the UE may determine whether the third SR occasion occurs within the threshold amount of time prior to the start of the next CDRX on duration of the next CDRX cycle of the UE. In some aspects, the UE may determine whether the third SR occasion occurs during the next CDRX on duration of the next CDRX cycle of the UE.

As further shown in FIG. 3E, and by reference number 322, the UE may transmit the SR in the third SR occasion based at least in part on the determination of whether the third SR occasion occurs within the threshold amount of time prior to the start of the next CDRX on duration and/or based at least in part on the determination of whether the third SR occasion occurs during the next CDRX on duration. For example, if the third SR occasion is the SR occasion that occurs at 54 milliseconds, the UE may refrain from transmitting the SR in the third SR occasion because the SR occasion that occurs at 54 milliseconds does not occur within the threshold amount of time prior to the start of the next CDRX on duration and does not occur during the next CDRX on duration.

As another example, if the third SR occasion is the SR occasion that occurs at 64 milliseconds, the UE may refrain from transmitting the SR in the third SR occasion because the SR occasion that occurs at 64 milliseconds does not occur within the threshold amount of time prior to the start of the next CDRX on duration and does not occur during the next CDRX on duration. As another example, the UE may transmit the SR if the third SR occasion is the SR occasion that occurs at 74 milliseconds, the UE may transmit the SR in the third SR occasion because the SR occasion that occurs at 74 milliseconds occurs within the threshold amount of time prior to the start of the next CDRX on duration.

In this way, the UE may be capable of identifying an SR occasion in which to transmit an SR based at least in part on an algorithm that takes into account the CDRX operation of the UE. In this way, the UE reduces the amount of time that the UE awakes from a CDRX sleep mode prior to the CDRX on duration and conserves processing, memory, battery, and radio resources that would have otherwise been consumed on transmitting an SR in the other SR occasions, which are likely to fail.

As indicated above, FIGS. 3A-3E are provided as one or more examples. Other examples may differ from what is described with respect to FIGS. 3A-3E.

Figure 4:
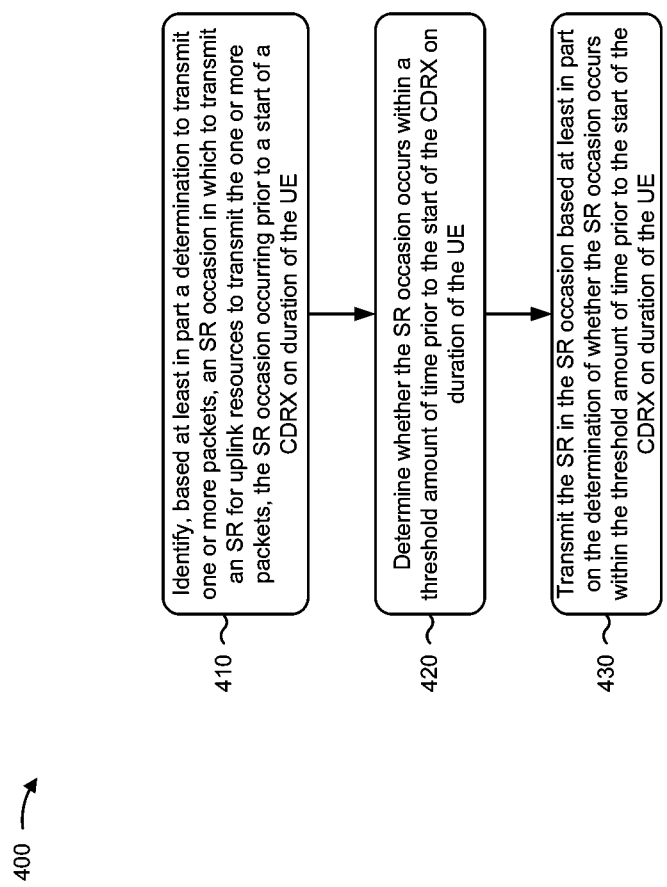
FIG. 4 is a diagram illustrating an example process performed, for example, by a UE, in accordance with various aspects of the present disclosure.

FIG. 4 is a diagram illustrating an example process 400 performed, for example, by a UE, in accordance with various aspects of the present disclosure. Example process 400 is an example where the UE (e.g., UE 120) performs operations associated with identifying an SR occasion for CDRX.

As shown in FIG. 4, in some aspects, process 400 may include identifying, based at least in part a determination to transmit one or more packets, an SR occasion in which to transmit an SR for uplink resources to transmit the one or more packets, the SR occasion occurring prior to a start of a CDRX on duration of the UE (block 410). For example, the UE (e.g., using receive processor 258, transmit processor 264, controller/processor 280, memory 282, and/or the like) may identify, based at least in part a determination to transmit one or more packets, an SR occasion in which to transmit an SR for uplink resources to transmit the one or more packets, the SR occasion occurring prior to a start of a CDRX on duration of the UE, as described above.

As further shown in FIG. 4, in some aspects, process 400 may include determining whether the SR occasion occurs within a threshold amount of time prior to the start of the CDRX on duration of the UE (block 420). For example, the UE (e.g., using receive processor 258, transmit processor 264, controller/processor 280, memory 282, and/or the like) may determine whether the SR occasion occurs within a threshold amount of time prior to the start of the CDRX on duration of the UE, as described above.

As further shown in FIG. 4, in some aspects, process 400 may include transmitting the SR in the SR occasion based at least in part on the determination of whether the SR occasion occurs within the threshold amount of time prior to the start of the CDRX on duration of the UE (block 430). For example, the UE (e.g., using receive processor 258, transmit processor 264, controller/processor 280, memory 282, and/or the like) may transmit the SR in the SR occasion based at least in part on the determination of whether the SR occasion occurs within the threshold amount of time prior to the start of the CDRX on duration of the UE, as described above.

Process 400 may include additional aspects, such as any single aspect or any combination of aspects described below and/or in connection with one or more other processes described elsewhere herein.

In a first aspect, an SR occasion periodicity, configured for the UE, comprises a 10 millisecond periodicity or a 20 millisecond periodicity. In a second aspect, alone or in combination with the first aspect, determining whether the SR occasion occurs within the threshold amount of time prior to the start of the CDRX on duration of the UE comprises determining that the SR occasion occurs within the threshold amount of time prior to the start of the CDRX on duration of the UE, and transmitting the SR in the SR occasion based at least in part on whether the SR occasion occurs within the threshold amount of time prior to the start of the CDRX on duration of the UE comprises transmitting the SR in the SR occasion based at least in part on the determination that the SR occasion occurs within the threshold amount of time prior to the start of the CDRX on duration of the UE.

In a third aspect, alone or in combination with one or more of the first and second aspects, determining whether the SR occasion occurs within the threshold amount of time prior to the start of the CDRX on duration of the UE comprises determining that the SR occasion does not occur within the threshold amount of time prior to the start of the CDRX on duration of the UE, and transmitting the SR in the SR occasion based at least in part on whether the SR occasion occurs within the threshold amount of time prior to the start of the CDRX on duration of the UE comprises refraining from transmitting the SR in the SR occasion based at least in part on the determination that the SR occasion does not occur within the threshold amount of time prior to the start of the CDRX on duration of the UE.

In a fourth aspect, alone or in combination with one or more of the first through third aspects, the SR occasion is a first SR occasion, and process 400 further comprises identifying, based at least in part on refraining from transmitting the SR in the first SR occasion, a second SR occasion that occurs after the first SR occasion, determining whether the second SR occasion occurs during the CDRX on duration of the UE, and transmitting the SR in the second SR occasion based at least in part on the determination of whether the second SR occasion occurs during the CDRX on duration of the UE. In a fifth aspect, alone or in combination with one or more of the first through fourth aspects, determining whether the second SR occasion occurs during the CDRX on duration of the UE comprises determining that the second SR occasion occurs during the CDRX on duration of the UE, and transmitting the SR in the second SR occasion comprises transmitting the SR in the second SR occasion based at least in part on the determination that the second SR occasion occurs during the CDRX on duration of the UE.

In a sixth aspect, alone or in combination with one or more of the first through fifth aspects, determining whether the second SR occasion occurs during the CDRX on duration of the UE comprises determining that the second SR occasion does not occur during the CDRX on duration of the UE, and transmitting the SR in the second SR occasion comprises refraining from transmitting the SR in the second SR occasion based at least in part on the determination that the second SR occasion does not occur during the CDRX on duration of the UE. In a seventh aspect, alone or in combination with one or more of the first through sixth aspects, process 400 further comprises identifying, based at least in part on refraining from transmitting the SR in the second SR occasion, a third SR occasion that occurs after the second SR occasion; determining whether the third SR occasion occurs within the threshold amount of time prior to another CDRX on duration in another CDRX cycle of the UE; and transmitting the SR in the third SR occasion based at least in part on the determination of whether the third SR occasion occurs within the threshold amount of time prior to the other CDRX on duration in the other CDRX cycle of the UE.

In an eighth aspect, alone or in combination with one or more of the first through seventh aspects, process 400 includes determining to transmit one or more packets based at least in part on receiving the one or more packets at a modem of the UE from an IMS layer of the UE, wherein the one or more is packets are received at the modem at a time prior to a starting time of the threshold amount of time based at least in part on an uplink packet offset time of the modem. In a ninth aspect, alone or in combination with one or more of the first through eighth aspects, the uplink packet offset time of the modem is based at least in part on an uplink processing parameter of the modem, a wake-up processing time of the modem and a timing of the SR occasion, and where an indication of the uplink packet offset time, an indication of a downlink processing time, and an indication of a CDRX onDurationtimer value is provided from the modem to the IMS layer of the UE.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
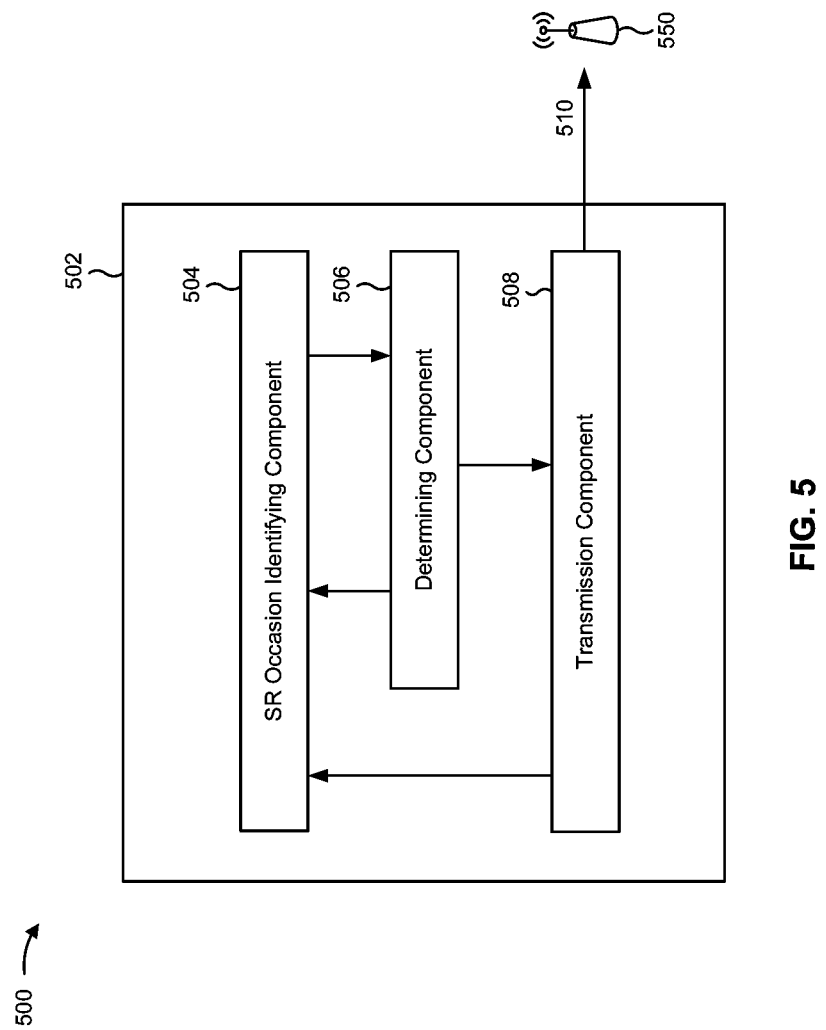
FIG. 5 is a conceptual data flow diagram illustrating the data flow between different modules/means/components in an example apparatus, in accordance with various aspects of the present disclosure.

FIG. 5 is a conceptual data flow diagram 500 illustrating the data flow between different modules/means/components in an example apparatus 502. The apparatus 502 may be a UE (e.g., UE 120). In some aspects, the apparatus 502 includes an SR occasion identifying component 504, a determining component 506, and/or a transmission component 508.

In some aspects, transmission component 508 may determine to transmit one or more packets to a BS 550 (e.g., BS 110). In some aspects, transmission component 508 may determine to transmit the one or more packets based at least in part on a receiving the one or more packets at a modem of the apparatus 502. In some aspects, transmission component 508 may receive the one or more packets from an IMS layer of the apparatus 502 or modem of the apparatus 502. The IMS layer may be part of the non-access stratum layers of the modem. In this case, transmission component 508 may receive the one or more packets at one or more access stratum layers of the modem (e.g., a UDP/IP or layer 3 layer, a Layer 2 layer, a Layer 1 layer, and/or the like). In some aspects, transmission component 508 may include a transmit processor (e.g., transmit processor 264), a controller/processor (e.g., controller processor 280), a memory (e.g., memory 282), a modem that is implemented by one or more of the transmit processor, the controller/processor, and/or the memory, and/or the like.

In some aspects, SR occasion identifying component 504 may identify a first SR occasion in which to transmit an SR 510 for uplink resources to transmit the one or more packets. In some aspects, the first SR occasion may occur prior to a start of a CDRX on duration of the apparatus 502. In some aspects, SR occasion identifying component 504 may identify the first SR occasion based at least in part on transmission component 508 determining to transmit the one or more packets. In some aspects, SR occasion identifying component 504 may include a receive processor (e.g., receive processor 258), a transmit processor (e.g., transmit processor 264), a controller/processor (e.g., controller processor 280), a memory (e.g., memory 282), a modem that is implemented by one or more of the receive processor, the transmit processor, the controller/processor, and/or the memory, and/or the like.

In some aspects, determining component 506 may determine whether the first SR occasion occurs within a threshold amount of time prior to the start of the CDRX on duration of the apparatus 502. In some aspects, determining component 506 may include a receive processor (e.g., receive processor 258), a transmit processor (e.g., transmit processor 264), a controller/processor (e.g., controller processor 280), a memory (e.g., memory 282), a modem that is implemented by one or more of the receive processor, the transmit processor, the controller/processor, and/or the memory, and/or the like.

In some aspects, transmission component 508 may transmit the SR 510 in the first SR occasion based at least in part on the determination of whether the first SR occasion occurs within the threshold amount of time prior to the start of the CDRX on duration of the apparatus 502. For example, determining component 506 may determine that the first SR occasion occurs within the threshold amount of time prior to the start of the CDRX on duration of the apparatus 502, and transmission component 508 may transmit the SR 510 in the first SR occasion based at least in part on the determination by determining component 506 that the first SR occasion occurs within the threshold amount of time prior to the start of the CDRX on duration of the apparatus 502. As another example, determining component 506 may determine that the first SR occasion does not occur within the threshold amount of time prior to the start of the CDRX on duration of the apparatus 502, and transmission component 508 may refrain from transmitting the SR 510 in the first SR occasion based at least in part on the determination by determining component 506 that the first SR occasion does not occur within the threshold amount of time prior to the start of the CDRX on duration of the apparatus 502.

In some aspects, if determining component 506 determines that the first SR occasion does not occur within the threshold amount of time prior to the start of the CDRX on duration of the apparatus 502, SR occasion identifying component 504 may identify a second SR occasion that occurs after the first SR occasion. Determining component 506 may determine whether the second SR occasion occurs during the CDRX on duration of the apparatus 502. Transmission component 508 may transmit the SR 510 in the second SR occasion based at least in part on the determination of determining component 506 of whether the second SR occasion occurs during the CDRX on duration of the apparatus 502.

For example, determining component 506 may determine that the second SR occasion occurs during the CDRX on duration of the apparatus 502, and transmission component 508 may transmit the SR 510 in the second SR occasion based at least in part on the determination by determining component 506 that the second SR occasion occurs during the CDRX on duration of the apparatus 502. As another example, determining component 506 may determine that the second SR occasion does not occur during the CDRX on duration of the apparatus 502, and transmission component 508 may refrain from transmitting the SR 510 in the second SR occasion based at least in part on the determination by determining component 506 that the second SR occasion does not occur during the CDRX on duration of the apparatus 502.

In some aspects, if determining component 506 determines that the second SR occasion does not occur during the CDRX on duration of the apparatus 502, SR occasion identifying component 504 may identify a third SR occasion that occurs after the second SR occasion. Determining component 506 may determine whether the third SR occasion occurs within the threshold amount of time prior to another CDRX on duration in another CDRX cycle of the apparatus 502. Transmission component 508 may transmit the SR 510 in the third SR occasion based at least in part on the determination of determining component 506 of whether the third SR occasion occurs within the threshold amount of time prior to the other CDRX on duration in the other CDRX cycle of the apparatus 502.

The apparatus 502 may include additional components that perform each of the blocks of the algorithm in the aforementioned process 400 of FIG. 4 and/or the like may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 5 are provided as an example. In practice, there may be additional components, fewer components, different components, or differently arranged components than those shown in FIG. 5. Furthermore, two or more components shown in FIG. 5 may be implemented within a single component, or a single component shown in FIG. 5 may be implemented as multiple, distributed components. Additionally, or alternatively, a set of components (e.g., one or more components) shown in FIG. 5 may perform one or more functions described as being performed by another set of components shown in FIG. 5.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    identifying, based at least in part a determination to transmit one or more packets, a scheduling request (SR) occasion in which to transmit an SR for uplink resources to transmit the one or more packets, the SR occasion occurring prior to a start of a connected discontinuous reception (CDRX) on duration of the UE;
    determining that the SR occasion occurs within a threshold amount of time prior to the start of the CDRX on duration of the UE; and
    transmitting the SR in the SR occasion based at least in part on determining that the SR occasion occurs within the threshold amount of time prior to the start of the CDRX on duration of the UE.

2. The method of claim 1, wherein an SR occasion periodicity, configured for the UE, comprises:
    a 10 millisecond periodicity, or
    a 20 millisecond periodicity.

3. The method of claim 1, further comprising:
    determining that a different SR occasion does not occur within the threshold amount of time prior to the start of the CDRX on duration of the UE; and
    refraining from transmitting the SR in the different SR occasion based at least in part on determining that the different SR occasion does not occur within the threshold amount of time prior to the start of the CDRX on duration of the UE.

4. The method of claim 1, further comprising:
    determining to transmit the one or more packets based at least in part on receiving the one or more packets at a modem of the UE from an Internet protocol multimedia subsystem (IMS) layer of the UE,
        wherein the one or more packets are received at the modem at a time prior to a starting time of the threshold amount of time based at least in part on an uplink packet offset time of the modem.

5. The method of claim 4, wherein the uplink packet offset time of the modem is based at least in part on:
    an uplink processing parameter of the modem,
    a wake-up processing time of the modem, and
    a timing of the SR occasion; and
    wherein an indication of the uplink packet offset time, an indication of a downlink processing time, and an indication of a CDRX onDurationtimer value is provided from the modem to the IMS layer of the UE.

6. The method of claim 1, wherein the one or more packets are received at a modem at a time prior to a starting time of the threshold amount of time based at least in part on an uplink packet offset time of the modem.

7. The method of claim 6, wherein the uplink packet offset time of the modem is based at least in part on one or more of:
    an uplink processing parameter of the modem,
    a wake-up processing time of the modem, or
    a timing of the SR occasion.

8. A user equipment (UE) for wireless communication, comprising:
    a memory; and
    one or more processors configured to:
        identify, based at least in part a determination to transmit one or more packets, a scheduling request (SR) occasion in which to transmit an SR for uplink resources to transmit the one or more packets, the SR occasion occurring prior to a start of a connected discontinuous reception (CDRX) on duration of the UE;
        determine that the SR occasion occurs within a threshold amount of time prior to the start of the CDRX on duration of the UE; and
        transmit the SR in the SR occasion based at least in part on determining that the SR occasion occurs within the threshold amount of time prior to the start of the CDRX on duration of the UE.

9. The UE of claim 8, wherein the one or more processors are further configured to:
    determine that a different SR occasion does not occur within the threshold amount of time prior to the start of the CDRX on duration of the UE; and
    refrain from transmitting the SR in the different SR occasion based at least in part on the determination that the different SR occasion does not occur within the threshold amount of time prior to the start of the CDRX on duration of the UE.

10. The UE of claim 8, wherein the one or more processors are further configured to:
  determine to transmit the one or more packets based at least in part on receiving the one or more packets at a modem of the UE from an Internet protocol multimedia subsystem (IMS) layer of the UE,
    wherein the one or more packets are received at the modem at a time prior to a starting time of the threshold amount of time based at least in part on an uplink packet offset time of the modem.

11. The UE of claim 8, wherein an SR occasion periodicity, configured for the UE, comprises:
  a 10 millisecond periodicity, or
  a 20 millisecond periodicity.

12. The UE of claim 8, wherein the one or more packets are received at a modem at a time prior to a starting time of the threshold amount of time based at least in part on an uplink packet offset time of the modem.

13. The UE of claim 12, wherein the uplink packet offset time of the modem is based at least in part on one or more of:
  an uplink processing parameter of the modem,
  a wake-up processing time of the modem, or
  a timing of the SR occasion.

14. A non-transitory computer-readable medium storing one or more instructions for wireless communication, the one or more instructions comprising:
  one or more instructions that, when executed by one or more processors of a user equipment (UE), cause the one or more processors to:
    identify, based at least in part a determination to transmit one or more packets, a scheduling request (SR) occasion in which to transmit an SR for uplink resources to transmit the one or more packets, the SR occasion occurring prior to a start of a connected discontinuous reception (CDRX) on duration of the UE;
    determine that the SR occasion occurs within a threshold amount of time prior to the start of the CDRX on duration of the UE; and
    transmit the SR in the SR occasion based at least in part on determining that the SR occasion occurs within the threshold amount of time prior to the start of the CDRX on duration of the UE.

15. The non-transitory computer-readable medium of claim 14, wherein an SR occasion periodicity, configured for the UE, comprises:
  a 10 millisecond periodicity, or
  a 20 millisecond periodicity.

16. The non-transitory computer-readable medium of claim 14, wherein the one or more instructions further cause the one or more processors to:
  determine that a different SR occasion does not occur within the threshold amount of time prior to the start of the CDRX on duration of the UE; and
  refrain from transmitting the SR in the different SR occasion based at least in part on determining that the different SR occasion does not occur within the threshold amount of time prior to the start of the CDRX on duration of the UE.

17. The non-transitory computer-readable medium of claim 14, wherein the one or more instructions further cause the one or more processors to:
  determine to transmit the one or more packets based at least in part on receiving the one or more packets at a modem of the UE from an Internet protocol multimedia subsystem (IMS) layer of the UE.

18. The non-transitory computer-readable medium of claim 17, wherein an indication of an uplink packet offset time, an indication of a downlink processing time, and an indication of a CDRX onDurationtimer value is provided from the modem to the IMS layer of the UE.

19. The non-transitory computer-readable medium of claim 14, wherein the one or more packets are received at a modem at a time prior to a starting time of the threshold amount of time based at least in part on an uplink packet offset time of the modem.

20. The non-transitory computer-readable medium of claim 19, wherein the uplink packet offset time of the modem is based at least in part on one or more of:
  an uplink processing parameter of the modem,
  a wake-up processing time of the modem, or
  a timing of the SR occasion.

* * * * *